United States Patent [19]

Aman et al.

[11] Patent Number: 5,095,497
[45] Date of Patent: Mar. 10, 1992

[54] TECHNIQUE FOR ACHIEVING THE FULL CODING GAIN OF ENCODED DIGITAL SIGNALS

[75] Inventors: Ahmad K. Aman, Ocean; Robert L. Cupo, Eatontown; Nicholas A. Zervos, Holmdel, all of N.J.

[73] Assignee: AT & T Bell Laboratories, Murray Hill, N.J.

[21] Appl. No.: 439,134

[22] Filed: Nov. 20, 1989

Related U.S. Application Data

[63] Continuation-in-part of Ser. No. 415,939, Oct. 2, 1989, abandoned.

[51] Int. Cl.⁵ .......................................... H04B 14/04
[52] U.S. Cl. ...................................... 375/34; 375/58; 375/60
[58] Field of Search .................. 375/18, 57, 58, 60, 375/34, 12; 341/53; 371/53, 43; 455/43, 63

[56] References Cited

U.S. PATENT DOCUMENTS

| | | | |
|---|---|---|---|
| 3,947,767 | 3/1976 | Koik et al. | 375/18 |
| 4,114,710 | 9/1978 | Katoh et al. | 375/18 |
| 4,888,775 | 12/1989 | Karabed et al. | 371/43 |
| 4,924,492 | 6/1990 | Gitlin et al. | 375/12 |

Primary Examiner—Benedict V. Safourek
Assistant Examiner—Tesfaldet Bocure
Attorney, Agent, or Firm—David R. Padnes

[57] ABSTRACT

In a telephone local loop transmission arrangement, data is communicated from the customer premises to the central office utilizing a multi-dimensional, passband signal illustratively at 480 kb/s. Specifically, the transmitted signal is encoded in a trellis code and precoded using a generalized partial response filter. The received signal is processed by a circuitry that implements a trellis decoding in combination with nonlinear filtering.

8 Claims, 7 Drawing Sheets

| Y2, Y1, Y0 | SUBSET |
|---|---|
| 0 0 0 | a |
| 0 0 1 | e |
| 0 1 0 | c |
| 0 1 1 | g |
| 1 0 0 | b |
| 1 0 1 | f |
| 1 1 0 | d |
| 1 1 1 | h |

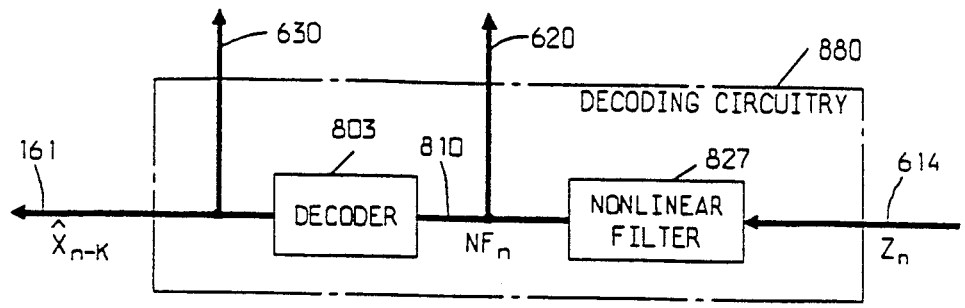

TECHNIQUE FOR ACHIEVING THE FULL CODING GAIN OF ENCODED DIGITAL SIGNALS

This application is a continuation-in-part of application Ser. No. 415,939, filed on Oct. 2, 1989, and now being abandoned as of the filing date hereof.

TECHNICAL FIELD

The present invention relates to data communication systems and, in particular, to coding and equalization in such systems.

BACKGROUND OF THE INVENTION

A great deal of research has been done on a precoding technique, namely, generalized partial response signaling (GPRS). For details on GPRS, one can refer to publications by M. Tomlinson, "New Automatic equalizer employing modulo arithmetic," *Electron. Lett.*, Vol. 7, nos. 5/6, Mar. 1971, pages 138-139; H. Harashima and H. Miyakawa, "Matched-transmission technique for channels with intersymbol interference," *IEEE Trans. Commun.*, Vol. COM-20, August 1972, pages 774-780 and J. Mazo and J. Salz, "On the Transmitted Power in Generalized Partial Response," *IEEE Trans. Commun.*, Vol. Com-24, March 1976, pages 348-352, all of which are hereby incorporated by reference.

The GPRS technique enables one to prevent signals from being adversely affected by intersymbol interference caused by a signal transmission through a channel having a finite memory and fixed characteristics. Knowing the impulse response of such a channel, one can design, in accordance with GPRS, a nonlinear filter in the transmitter for precoding the signals to be transmitted. This precoding compensates for, inter alia, intersymbol interference caused by the nonideal characteristics of the channel. GPRS, however, is not particularly useful for intersymbol interference compensation in actual communication system applications. This stems from the fact that actual communication channels have a virtually infinite memory and time-variant characteristics, as opposed to the finite memory and fixed characteristics required by GPRS.

Much attention has been focused in recent years on signal-space codes which provide so-called "coding gain." Prominent among these are the so-called "trellis" codes described in such papers as G. Ungerboeck, "Channel Coding with Multilevel/Phase Signals," *IEEE Trans. Information Theory*, IT-28, 1982, pages 55-67; A. R. Calderbank and N. J. A. Sloane, "A New Family of Codes for Dial-Up Voice Lines," *Proc. IEEE Global Telecomm. Conf.*, November 1984, pages 20.2.1-20.2.4; A. R. Calderbank and N. J. A. Sloane, "Four-Dimensional Modulation With an Eight-State Trellis Code," *AT&T Technical Journal*, Vol. 64, No. 5, May- June 1985, pages 1005-1018; A. R. Calderbank and N. J. A. Sloane, "An Eight-Dimensional Trellis Code," *Proc. IEEE*, Vol. 74, No. 5, May 1986, pages 757-759; and L-F Wei, "Rotationally Invariant Convolutional Channel Coding with Expanded Signal Space—Part I: 180 Degrees and Part II: Nonlinear Codes," *IEEE J. Select. Areas Commun.*, Vol. SAC-2, September 1984, pages 659-686, all of which are hereby incorporated by reference. Commercial use of these codes has, for the most part, been concentrated in voice-band data sets and other carrier data communication systems. The term "coding gain" refers to the increased performance of a system resulting from the use of a particular code. It is defined as the amount by which the signal-to-noise ratio (SNR) may deteriorate for a system utilizing that particular code before the bit error rate for this system equals that of the same system without using the code.

The trellis codes that have been developed to date provide full coding gain in the presence of "white" noise, i.e., noise that contains components of virtually every frequency in the spectrum. However, the noise that appears in a received signal to be decoded is dependent upon the characteristics of the channel through which the signal was transmitted. Many communication channels, for example, a single two-wire pair or "local loop" of a telephone cable network that connects customer premises to a central office, impart a received signal with non-white or "colored" noise. This being so, the resulting coding gain in systems using such channels is less than the full coding gain. Indeed, in many system applications the difference between the full coding gain and that actually realized is significant. The failure to realize the full coding gain poses a problem with, for example, the proposed implementation of the Integrated Services Digital Network (ISDN). Relying on the full coding gain of, for example, the trellis code, ISDN purports to provide high signal rates on the local loops while a nominal SNR is maintained. Not having this full coding gain realizable makes the implementation of ISDN extremely difficult. Accordingly, it is desirable to have such a coding gain fully or substantially realized.

SUMMARY OF THE INVENTION

The present invention increases the coding gain realizable for a predetermined code which provides a coding gain in the presence of white noise. The inventive technique requires first and second coding processes in a transmitter, and noise-whitening apparatus and non-linear signaling processing in the associated receiver. Specifically, the first coding process encodes input data with the predetermined code. The noise-whitening apparatus increases the realizable coding gain provided by the predetermined code. The second coding process compensates for the effect of the noise-whitening apparatus which would otherwise degrade system performance. Finally, the nonlinear signaling processing in the receiver is associated with the second coding process and compensates for the operation of the same.

In each of three disclosed embodiments, the first coding process in the transmitter is trellis coding. The whitening apparatus in the receiver increases the realizable coding gain by ensuring that the noise at the input to the trellis decoder is white. The second coding process in the transmitter and the associated non-linear signaling processing is GPRS which is utilized to compensate for the undesirable effects of the noise-whitening apparatus.

In particular, a first embodiment discloses a receiver arrangement in which the non-linear signaling processing follows the trellis decoding. Second and third embodiments disclose a different arrangement in which the non-linear signaling processing, by contrast, precedes the trellis decoding, thereby advantageously simplifying the decoding process. For further simplification thereof as illustrated in the third embodiment, one needs to provide more power, as compared with the first and second embodiments, to carry out the second coding process in the transmitter.

BRIEF DESCRIPTION OF THE DRAWING

In the drawing,

FIG. 2 shows the signal constellation used in a coder of the duplex wideband network termination of FIG. 1;

FIG. 3 is a table useful in explaining the operation of the coder within the duplex wideband network termination of FIG. 2;

FIG. 8 is a block diagram of a circuitry embodying the principles of the present invention, which performs decoding of received signals in a second embodiment of the present invention; and FIG. 9 is a signal constellation appearing at the input of the decoding process performed by the circuitry of FIG. 8 using the signal constellation of FIG. 2.

DETAILED DESCRIPTION

Three illustrative embodiments which implement the present invention are described hereinbelow. Duplex wideband network termination (DWNT) 101 of FIG. 1 includes a first embodiment of an arrangement in accordance with the present invention. DWNT 101 is illustratively used to implement ISDN via a single two-wire pair or "local loop" between customer premises and a central office (not shown). In particular, ISDN would provide a customer with duplex, i.e., simultaneous two-directional, digital transmission capability at a speed ranging from the so-called ISDN "basic" (2B+D) rate (with framing, maintenance and control bits) or 160 kb/s up to the so-called "primary" (23B+D) rate (again with framing, maintenance and control bits) up to 1.544 Mb/s and even beyond.

Specifically, data from various digital signal sources, such as a simple computer terminal, a cluster controller, a minicomputer, a digital video signal source, etc., on the customer premises is applied to a multiplexer/demultiplexer (mux/demux) 50 within DWNT 101. The latter embeds the signals from these sources in an outbound 480 kb/s data stream on lead 54. That data stream could be formatted, for example, using an ISDN-type format, although an ISDN standard for 480 kb/s has not yet been adopted. The data stream on lead 54 is input to the aforementioned DWNT 101, which communicates its input data to a central office via a two-wire local loop 60 of a maximum length of 18 kft per ISDN standards. Within the central office, the bit stream is recovered from the transmitted line signal by a duplex wideband line termination (DWLT) (not shown) associated with DWNT 101 and, after being demultiplexed, is passed to a digital switch. The latter may be, for example, a 5ESS switch manufactured by AT&T which includes software which processes the framing, maintenance, and/or control information carried in the so-called "D" channel of the ISDN signal.

DWNT 101 and the associated DWLT are complementary in their function. For a given direction of transmission, one of them performs as a transmitter and the other as a receiver. Thus, data from the digital switch destined for the customer premises, also at 480 kb/s, is passed to the DWLT which generates a line signal representing that data. The line signal is then transmitted over local loop 60 to DWNT 101 which then recovers the data and passes it to the customer premises. Indeed, the circuitry within DWNT 101 and the associated DWLT is very similar to that in the other and, as far as the generation and processing of line signals is concerned, they may be regarded as being identical.

In general, a DWNT embodying the principles of the present invention can be manufactured with the capability of operating over a range of bit rates, with the bit rate actually used at a particular time being either selected manually via, say, a front panel control or adaptively by the DWNT/DWLT pair themselves during their start-up sequence.

Figure 1:
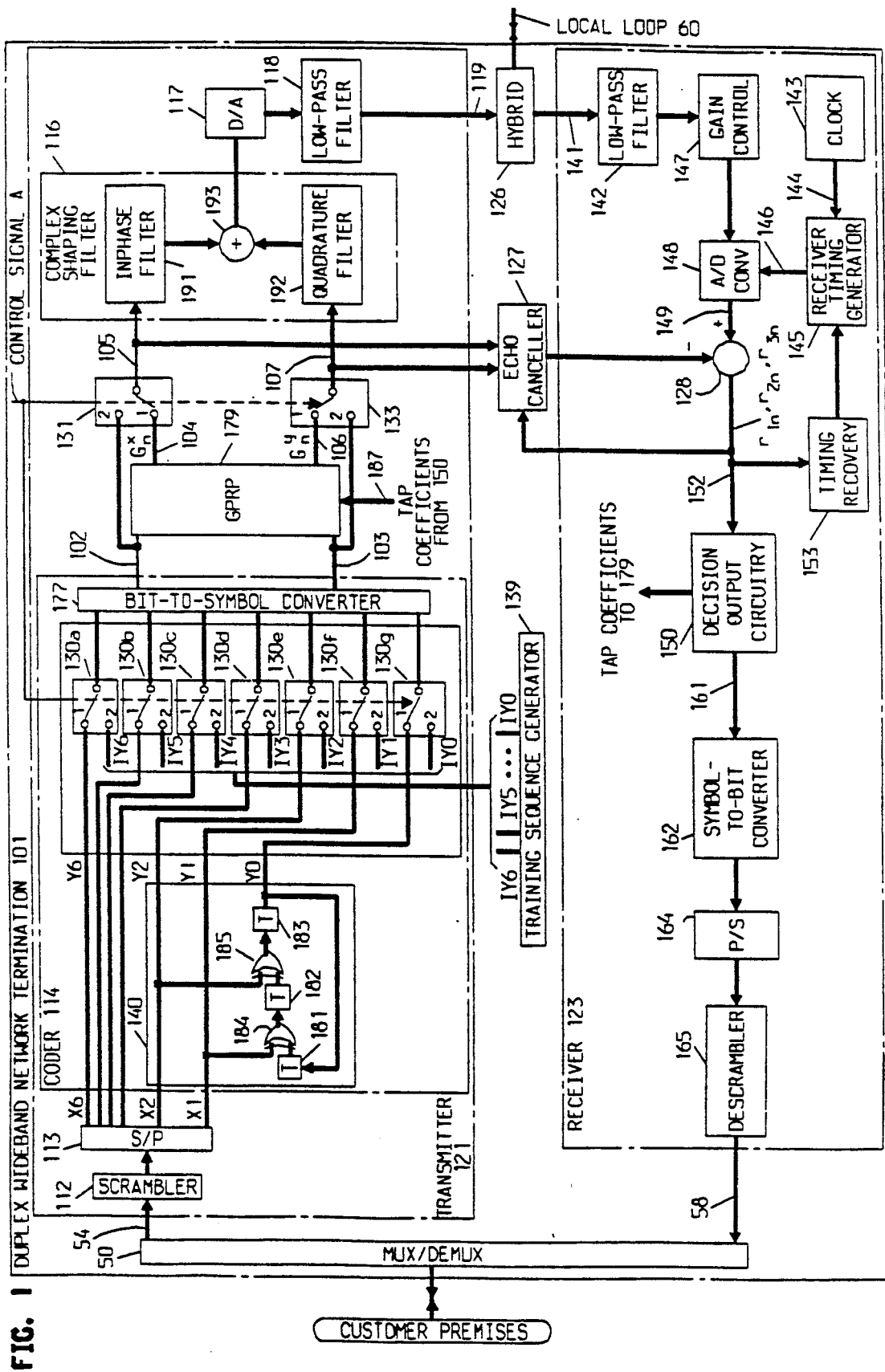
FIG. 1 shows a block diagram of a duplex wideband network termination including a first embodiment of an arrangement in accordance with the present invention, which is illustratively used in a telephone local loop data transmission scheme.

Referring to FIG. 1, specifically, the aforementioned 480 kb/s signal on lead 54 is received by transmitter section 121 within DWNT 101 and is applied therewithin to a scrambler 112. The latter, in a conventional fashion, randomizes the data so as to eliminate the possibilities of generating tones within the line signal ultimately to be generated. Scrambler 112 may be, for example, of the type shown in U.S. Pat. No. 3,515,805 issued June 2, 1970, to R. Fracassi, and U.S. Pat. No. 4,304,962 issued Dec. 8, 1981, to R. Fracassi, et al. Scramblers of this type are also described in polynomial form in CCITT V.32 Recommendation, "A Family of 2-Wire, Duplex Modems Operating at Data Signaling Rates of up to 9600 Bit/s for Use on the General Switched Telephone Network and on Leased Telephone-Type Circuits, " *Red Book*, Volume VIII—Fascicle VIII-1, Data Communications Over the Telephone Network, VIIIth Plenary Assembly, Malaga-Torremolinos, pp. 221-238, Oct. 8-19, 1984. The output bits of scrambler 112, still at a 480 kb/s rate, are thereupon converted to six-bit words by serial-to-parallel (S/P) converter 113, the bits of each such word being denoted X1 through X6. These six-bit words, occurring at 480,000/6=80,000 per second, are thereupon mapped by a coder 114 into a stream of symbols—one symbol for each word—yielding a symbol rate of 80 kilobaud.

Specifically, coder 114 expands the six-bit words received from serial-to-parallel converter 113 into seven-bit words comprised of bits Y0 through Y6. Bits Y0, Y1 and Y2 are generated by trellis coder 140 within coder 114 in response to bits X1 and X2, as described in further detail hereinbelow, while bits Y3 through Y6 are identical to bits X3 through X6.

At this point, it should be noted that DWNT 101 operates in two modes, namely—a training mode and a normal operation mode. Generally the training mode, during which tap coefficients of adaptive filters in DWNT 101 are initialized, precedes the normal operation mode. The change from one mode to the other is illustratively achieved by means of switches. Each of these switches has two positions, position 1 being for the normal operation mode and position 2 being for the training mode. Toggling from one mode to the other is in response to a control signal A.

In the normal operation mode, switches 130 a through g respectively couple bits Y0 through Y6 to bit-to-symbol converter 177. However, in response to the aforementioned control signal A, switches 130 a through g couple initialization bits IY0 through IY6, instead, to that bit-to-symbol converter to facilitate the initialization of the tap coefficients in a manner to be described. Bits IY0–IY6 are uncoded training bits supplied by training sequence generator 139 of conventional design.

Bit-to-symbol converter 177 maps each of the $2^7$ or 128 different combinations of its input bit values into one of 128 two-dimensional symbols in a predetermined constellation. One illustrative constellation is shown in FIG. 2.

More specifically, each of the 128 symbols of the constellation in FIG. 2 is assigned to a particular one of eight partitions, or subsets, labelled a through h. In the normal operation mode, the values of bits Y0, Y1 and Y2 identify, in accordance with the assignment scheme shown in FIG. 3, the particular one of the eight subsets from which the symbol currently being identified is to come while the values of bits Y3 through Y6 identify a particular one of the sixteen symbols within the identified subset.

The assignment of each of the sixteen different combinations of the values of bits Y3 through Y6 to a particular symbol within the identified subset can be arbitrary. However, by appropriate choice of a) the so-called trellis code used by trellis coder 140 to generate bits Y0, Y1 and Y2, b) the constellation, and c) the partitioning of the constellation into particular subsets, so-called "coding gain" is achieved. Such coding gain manifests itself in the form of enhanced receiver immunity to channel noise as compared to the channel noise immunity of an "uncoded" system in which each symbol of (in this example) a 64-symbol constellation would be used to directly represent a different one of the $2^6=64$ different combinations of the values of bits X1 through X6.

A circuit embodiment of trellis coder 140 is explicity shown in FIG. 1. Specifically, trellis coder 140 is a finite-state machine which includes delay elements 181, 182 and 183 and exclusive-OR gates 184 and 185. Each of the delay elements imparts a symbol interval delay of T seconds to its inputs, where T is the reciprocal of the symbol rate, i.e., T=1/80,000 and is commonly referred to as the symbol interval. The inputs of exclusive-OR gate 184 are bit X1 and the output of delay element 181. The inputs of exclusive-OR gate 185 are bit X2 and the output of delay element 182. Delay element 181 receives as its input the output of delay element 183; delay element 182 receives as its input the output of exclusive -OR gate 184; and delay element 183 receives as its input the output of exclusive-OR gate 185. The output of delay element 183 also serves as output bit Y0.

Figure 4:
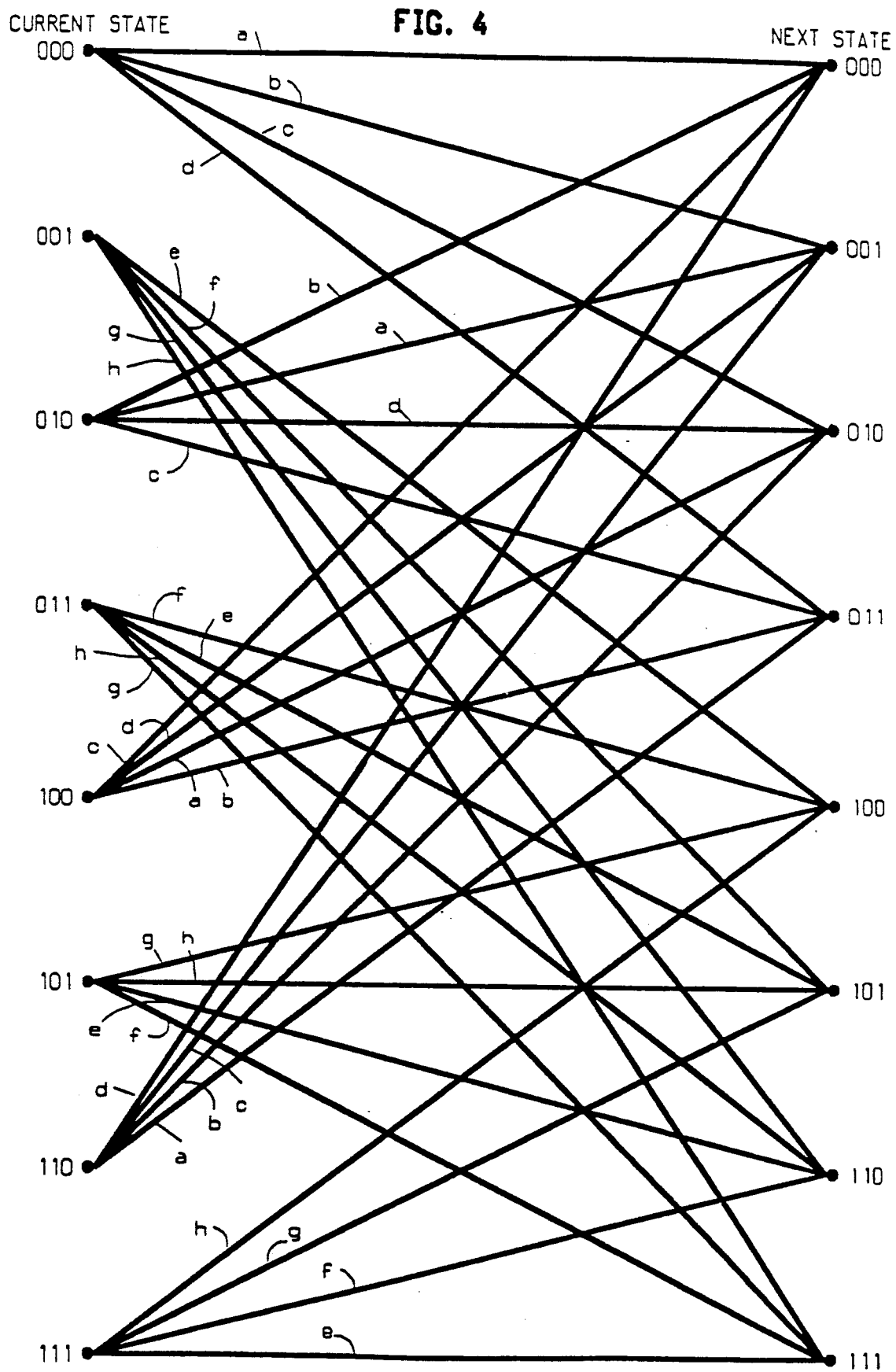
FIG. 4 is a trellis diagram graphically depicting the so-called convolutional code used in the duplex wideband network termination of FIG. 3.

The underlying premise of trellis coding is that, at any point in time, only the symbols in particular subsets of the constellation are allowed to be transmitted, and these subsets are determined by the "state" of the trellis coder. The trellis diagram of FIG. 4, for example, represents the operation of trellis coder 140. As shown in FIG. 4, trellis coder 140 has eight "states", binary 000 through binary 111, given by the values of the bits currently stored in delay elements 181, 182 and 183. Thus, for example, if the coder is in state 001, this means that delay elements 181 and 182 each currently hold a logic "0" and delay element 183 currently holds a logic "1". The two sets of vertically aligned points in FIG. 4 represent the eight possible coder states at each of two successive time intervals. One of these sets is designated as current state and the other set is designated as next state. The lines or edges, connecting various pairs of states indicate the possible state transitions. Thus, for example, it is possible for the coder to transition from state 010 to state 001 but not to state 100.

Each of the connecting lines in FIG. 4 bears a label indicating which subset the symbol being generated is to come from. Thus, continuing the example above, assume that the current state of the coder—i.e., the contents of delay elements 181, 182 and 183, is 010 and that, after the next six-bit word is supplied by serial-to-parallel converter 113, the new state is state 001. This means that the next symbol to be output is to come from subset "a" since the line connecting state 001 in the left column to state 111 in the right column is so labeled. With the coder now in state 001, the next symbol to be output will come from one of the subsets "e", "f", "g" or "h", depending on the upcoming values of X1 and X2.

Referring again to FIG. 1, bit-to-symbol converter 177 respectively provides on its output leads 102 and 103 the in-phase and quadrature -phase components of the symbol identified by bits Y0–Y6 or bits IY0–IY6. In terms of the constellation diagram of FIG. 2, these components represent the "x" and "y" components of the identified symbol. Leads 102 and 103 are extended in the normal operation mode to generalized partial response precoder (GPRP) 179 via the setting of switches 131 and 133 to their respective positions 1. Like switches 130 a–g described before, switches 131 and 133 change to their respective positions 2 in response to the aforementioned control signal A, resulting in the training mode. That is, in the training mode, switches 131 and 133 short, respectively, lead 102 to lead 105 and lead 103 to lead 107. As a result, GPRP 179 is illustratively bypassed.

Figure 5:
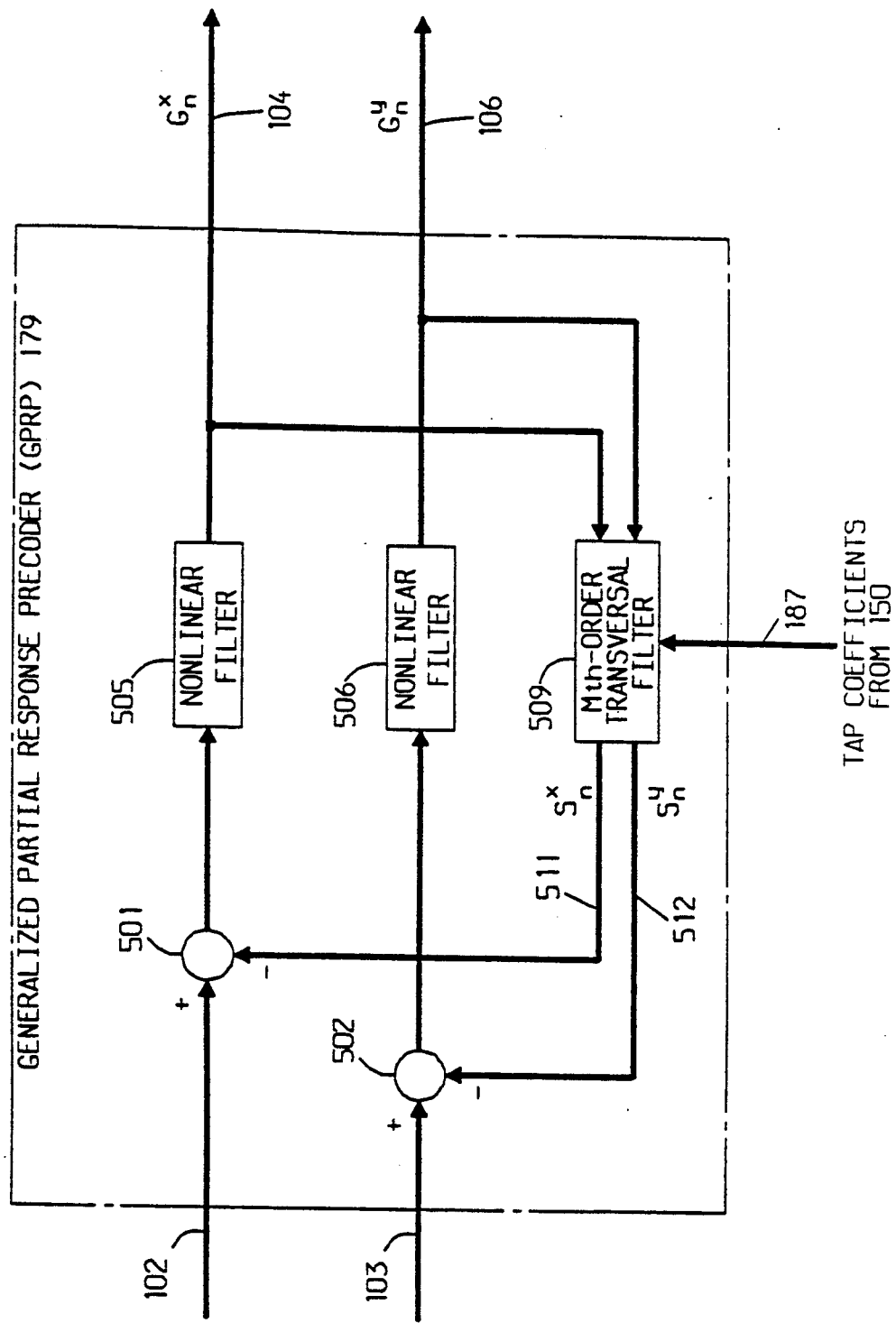
FIG. 5 is a block diagram of a circuitry embodying the principles of the present invention, which precodes the signals to be transmitted in the duplex wideband network termination of FIG. 1.

GPRP 179 performs GPRS precoding which prevents certain intersymbol interference from being injected into a received signal. FIG. 5 shows GPRP 179 which comprises subtracter 501, subtracter 502, nonlinear filter 505, nonlinear filter 506 and Mth-order transversal filter 509. Subtracter 501 takes in an output of Mth-order transversal filter 509, namely $S_n^x$, which is to be described, as one input, and the inphase component on lead 102 as the other. This subtracter subtracts the value of $S_n^x$ from the value of the inphase component. The resulting value, $\alpha^x$, is represented by a signal which is applied at the input of nonlinear filter 505.

This filter in general performs a nonlinear function F on its input signal whose value is, say, $\alpha$. The value of the output signal generated by the filter is thus $F(\alpha)$, which is equal to $\alpha$ if $-L \leq \alpha \leq L$; otherwise $\alpha$ is reduced to this range of $-L$ to $L$ by algebraically adding or subtracting an appropriate multiple of 2L and the result becomes $F(\alpha)$.

In this instance, since the input value is $\alpha^x$, nonlinear filter 505 thus generates on lead 104 an output signal which represents $F(\alpha^x)$. In addition, nonlinear filter 505 effects a bound of L on the absolute value of its output signal, thereby limiting the power of same. In accordance with GPRS, the value of L is defined to be 0.5 $C^x I^x$ where $C^x$ is the number of possible levels assumable by the "x" component of a symbol in the constellation, and $I^x$ is the intersymbol distance along the X-axis. This resulting value of L is hereinafter referred to as the "GPRS bound". As illustratively shown in FIG. 2, the "x" component of a symbol can assume 12 possible levels, and the intersymbol distance is two units along the X-axis. Therefore, L=12 and the GPRS bound in this embodiment.

The signal on lead 104 at the $n^{th}$ transmission interval is denoted $G_n^x$ and is processed with another signal, $G_n^y$, by complex shaping filter 116 in a manner to be described. $G_n^y$, like $G_n^x$, is formed by first having subtracter 502 subtract the value of $S_n^y$, which is another output of Mth-order transversal filter 509, from the value of quadrature component on lead 103. The resulting value, $a^y$, is represented by a signal which is input to nonlinear filter 506. The latter is identical to nonlinear filter 505 and thus provides on lead 106 $G_n^y$ whose value is $F(a^y)$. Even though the GPRS bound value of L associated with nonlinear filter 506 is now defined as 0.5 $C^y I^y$ (where $C^y$ is the number of possible levels assumable by the "y" component of a symbol in the constellation, and $I^y$ is the intersymbol distance along the Y-axis), as it can be seen from FIG. 2, this value remains 12 in this particular embodiment.

$G_n^x$ and $G_n^y$ are also fed back to Mth-order transversal filter 509 of conventional design, which generates as its outputs $S_n^x$ and $S_n^y$ on, respectively, leads 511 and 512 in accordance with the relations:

$$S_n^x = \text{Re}(P_n^T b_n), \text{ and}$$

$$S_n^y = \text{Im}(P_n^T b_n).$$

In these expressions, $b_n$ is a (M×1) matrix, or vector, comprised of the M most recent inputs of transversal filter 509 which are represented by complex numbers. That is, $$bn = \begin{bmatrix} G_{n-1}^x + iG_{n-1}^y \\ G_{n-2}^x + iG_{n-2}^y \\ \cdot \\ \cdot \\ \cdot \\ G_{n-M}^x + iG_{n-M}^y \end{bmatrix},$$

where $i=\sqrt{-1}$ and M is a selected finite integer. The value of M is intrinsic to the characteristics of the channel used. In the present embodiment, the illustrative channel being a conventional 18 kft, 24 guage two-wire local loop with no bridge tap, the value of M associated therewith is experimentally determined to be 7.

$P_n$ is a (M×1) vector or matrix comprised of an ensemble of M tap coefficients associated with transversal filter 509. That is, $$P_n = \begin{bmatrix} p_{n,r}^1 + ip_{n,im}^1 \\ p_{n,r}^2 + ip_{n,im}^2 \\ \cdot \\ \cdot \\ \cdot \\ p_{n,r}^M + ip_{n,im}^M \end{bmatrix},$$

where $p_{n,r}^1 + i\, p_{n,im}^1$, $i\, p_{n,r}^2 + i\, p_{n,im}^2 \ldots p_{n,r}^M + i\, p_{n,im}^M$ are complex numbers used as the respective M tap coefficients at the $n^{th}$ transmission interval. As to be described hereinbelow, these tap coefficients are supplied from decision output circuitry 150. (The superscript "T" used in the above expressions indicates the matrix transpose operation wherein (M×1) vector $P_n$ is transposed into (1×M) vector for the purpose of matrix multiplication.) In addition, Re is an operation that eliminates the imaginary component of a complex number and Im is another operation that eliminates the real component of same. For example, Re(2+i3)=2 and Im(2+i3)=3.

In the course of the precoding process, GPRP 179 renders, in a conventional manner, more different values assumble by each of $G_n^x$ and $G_n^y$ than each of the respective in-phase and quadrature-phase component inputs. This being so, $G_n^x$ and $G_n^y$ respectively represent more "x" and "y" components of symbols than those component inputs. That is, after the precoding process, $G_n^x$ and $G_n^y$ combinedly represent more symbols to be transmitted than the symbols defined in the constellation of FIG. 2. Equivalently stated, the precoding process effects an expansion of the constellation of FIG. 2.

The signals on, respectively, lead 105 and lead 107 are applied to complex shaping filter 116, which generates a passband signal which is illustratively a so-called "carrierless AM/PM" signal.

Implementationally, complex shaping filter 116 is, illustratively, comprised of two finite-impulse-response digital filters of conventional design-in-phase filter 191 and quadrature phase filter 192—which filter the signals on leads 105 and 107, respectively. Each of these filters is illustratively realized as a transversal filter. Filters 191 and 192 differ from each other only in that their phase characteristics are offset from one another by $\pi/2$. This phase difference enables the receiver section of the associated DWLT to separately reconstruct the signals on leads 105 and 107. The outputs of filters 191 and 192 are combined in an adder 193 to provide a digital version of the desired outbound line signal.

It is important to note that the approach taken within complex shaping filter 116 for generating a passband signal in response to the two-dimensional symbols represented by the signals on leads 105 and 107 is different from the modulation typically used in, for example, voiceband modems, such as quadrature amplitude modulation, or QAM. In the latter, specifically, an explicit or implicit (depending on the implementation) rotation of the symbols by a carrier-frequency-dependent angle occurs. However no such explicit or implicit rotation is performed with carrierless AM/PM. This is significant because unless there happens to be an integral relationship between the carrier frequency and the symbol interval T (which is not likely to be the case if the carrier frequency and symbol interval values are chosen to optimize the performance of the transmission scheme as a whole), the aforementioned rotation operation will involve a non-trivial multiplication, thereby adding not insignificantly to the cost of the transmitter section. A further advantage is that carrierless AM/PM is more simply processed at the receiver than, for example, QAM. Additionally, carrierless AM/PM is potentially more robust in the presence of non-linearities, such as may be introduced in the analog-to-digital conversion performed in the receiver.

The output of complex shaping filter 116 is converted to analog form by D/A converter 117 whose output is then passed through low pass filter 118 to remove the higher-frequency images of the desired signal. Hybrid 126 thereupon extends the resulting outgoing line signal appearing on transmitter section output lead 119 to its two-wire side and thence onto local loop 60.

Turning now to the inbound transmission direction, the line signal generated on local loop 60 by the associated DWLT is received by hybrid 126 which routes that signal on to receiver section 123 and, more particularly, low-pass filter 142 thereof. The latter filters out energy in the received signal at frequencies nominally above the spectrum of the transmitted signal. The resulting filtered signal passes to gain control circuit 147 which is programmable to adjust the gain imparted to its input so as to make maximum use of the precision of A/D converter 148 which follows. The gain of circuit 147 is set, based on the level of its input signal during modem initialization or training, and is thereafter held at the initially set value, in accordance with standard practice for echo-canceller-based data communications.

Receiver section 123 further includes a clock 143, which generates a predetermined number of clock pulses every T seconds on lead 144. These are received by receiver timing generator 145, which counts the pulses on lead 144 and generates timing signals on a number of output leads to control the sequencing of the various signal processing functions within the receiver. One of these leads, shown explicitly, is lead 146. The latter extends pulses to A/D converter 148 at a rate which causes the converter to generate samples of the received signal, referred to as "line samples", at 3/T samples per second on output lead 149.

Each of the samples on lead 149 includes an echo component that is dominantly comprised of the so-called "near echo" and secondarily comprised of the so-called "far echo." The near echo results from energy that "leaks" from transmitter output lead 119 through hybrid 126 to receiver input lead 141, and the far echo arises from reflections of the transmitted signal from the transmission channel. Echo canceller 127, in response to the symbols represented on leads 105 and 107, generates digital samples, each representing the echo component of a respective one of the samples on lead 149. This echo replica signal is subtracted from the samples on lead 149 in subtracter 128 to provide an echo-compensated signal on lead 152.

The echo-compensated signal on lead 152, in addition to being further processed as described below to recover the bit stream communicated from mux/demux 50 is also used by echo canceller 127 as an error signal in response to which it adapts its transfer function in such a way as to minimize the residual echo component of the signal on lead 152. Echo canceller 127 is, illustratively, of the type shown in U.S. Pat. No. 4,464,545 issued Aug. 7, 1984, to J. Werner, hereby incorporated by reference. Among its more significant parameters, echo canceller 127 illustratively has a memory span of 40 symbols, adaptation step size of $2^{-20}$ and arithmetic precision of 26 bits using fixed point arithmetic. These parameters are expected to provide at least 65 dB of near echo attenuation, this being the likely minimum necessary level of near echo cancellation for this application.

The line samples on subtracter output lead 152 generated during the $n^{th}$ receiver symbol interval are denoted $r_{1n}$, $r_{2n}$ and $r_{3n}$. These three line samples are passed to decision output circuitry 150 for further processing to be described hereinbelow. It may be noted at this point, however, that line samples $r_{1n}$, $r_{2n}$ and $r_{3n}$ are also applied to timing recovery circuit 153, which uses them to control timing generator 145. (Other types of timing recovery schemes, such as those employing out-of-band tones or other out-of-band signals might alternatively be used.) Although, as noted hereinbefore, the associated DWLT may be regarded as substantially identical to DWNT 101, one small difference is that DWLT, illustratively, does not include a timing recovery circuit corresponding to timing recovery circuit 153. Rather, the receiver timing generator in that DWLT operates exclusively in response to the clock therein, the latter, in turn, being controlled by a network timing signal provided from within the central office. The frequency of the clock of the DWLT thus becomes the controlling frequency for the operations of both the transmitter and receiver sections of both DWNT 101 and the associated DWLT. As previously noted, line samples $r_{1n}$, $r_{2n}$ and $r_{3n}$ on lead 152 are further processed by decision output circuitry 150.

Figure 6:
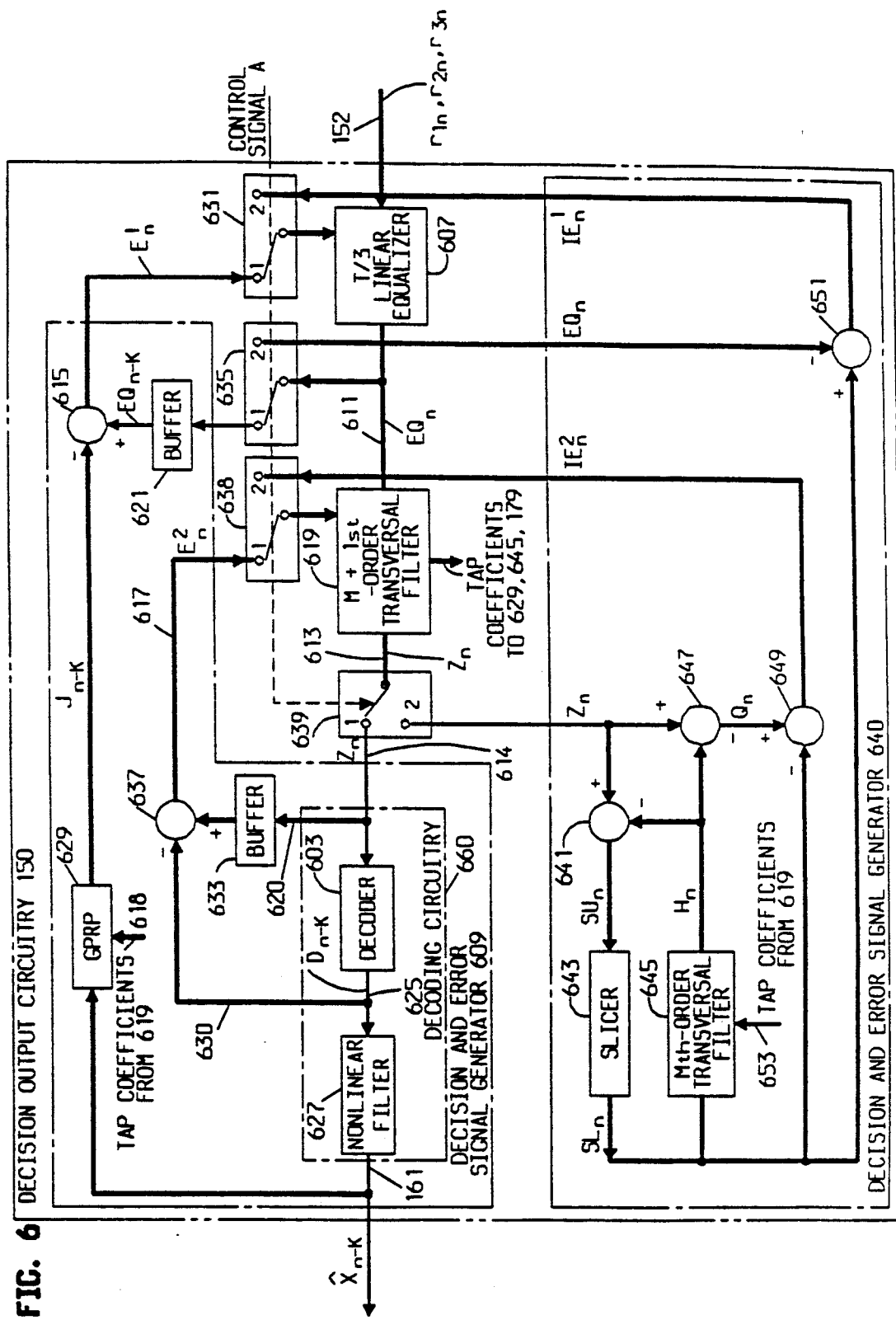
FIG. 6 is a block diagram of a circuitry embodying the principles of the present invention, which performs equalization and decoding of received signals in the duplex wideband network termination of FIG. 1.

Turning to FIG. 6, decision output circuitry 150 comprises T/3 linear equalizer 607, M + 1st-order transversal filter 619, decision and error signal generators 609 and 640, and switches 631, 635, 638 and 639. Specifically, T/3 linear equalizer 607 eliminates from the line samples the so-called "precursors", the intersymbol interference caused by local loop 60. To this end, line samples $r_{1n}$, $r_{2n}$ and $r_{3n}$ are applied to linear equalizer 607 which is of conventional design and may be, for example, of the type disclosed in U.S. Pat. No. 3,868,603 issued Feb. 25, 1975, to Guidoux, hereby incorporated by reference. Since linear equalizer 607 receives and processes more than one input for each symbol interval, it is referred to as a "fractionally spaced" equalizer. It is, more specifically, referred to as a T/3 type of fractionally spaced equalizer since it receives and processes inputs at a rate of three per symbol interval, and thus has a so-called "tap" spacing of T/3. A fractionally-spaced linear equalizer is advantageous as compared to a so-called symbol-interval-spaced equalizer because, for example, it is insensitive to phase distortion in the channel and to the time intervals or epochs during which the successive line samples are formed.

The output of T/3 linear equalizer 607 on lead 611 is generated once per symbol interval and is comprised of the real and imaginary components, respectively, $eq_n$ and $eq_n^*$ of a complex signal $EQ_n$. At this point, it should be noted that decision output circuitry 150 of FIG. 1 operates in concert with the rest of the circuitry of DWNT 101 in either of the normal operation mode and training mode in response to the aforementioned control signal A.

The following delineates the process of decision output circuitry 150 in the normal operation mode. In this mode, T/3 linear equalizer 607 and M + 1st-order transversal filter 619 are connected to decision and error signal generator 609. Specifically, switch 639 connects output lead 613 of transversal filter 619 to input lead 614 of decoding circuitry 660 within decision and error signal generator 609; switch 638 couples an error signal $E_n^2$ from the generator to transversal filter 619; switch 635 couples $EQ_n$ on lead 611 to buffer 621 within the generator; and switch 631 couples an error signal $E_n^1$ from the generator to linear equalizer 607.

$E_n^1$ is indicative of the difference in value between the output signal of linear equalizer 607 and decisions thereafter made in the receiver as to what the transmitted symbols actually were. A particular one of these decisions provided at the output of decision and error signal generator 609 during the $n^{th}$ receiver symbol interval is a complex signal $X_{n-K}$ on lead 161 having, respectively, the real and imaginary components $x_{n-K}$ and $x_{n-K}^*$. K is an experimentally determined constant delay needed by decoder 603 to decode a particular trellis code by the conventional Viterbi algorithm. (In the present embodiment, the trellis code used in coder 140 experimentally requires K=15.)

As a result of the delay in decoder 603, the error signal $E_n^1$ generated by decision and error signal generator 609 involves storing $EQ_n$ in buffer 621 for K symbol intervals so that the current output thereof is a complex signal $EQ_{n-K}$ which was the output from linear equalizer 607 K symbol intervals ago. The complex signal $EQ_{n-K}$ has real and imaginary components, respectively, $eq_{n-K}$ and $eq_{n-K}^*$. The formation of $E_n^1$ also involves processing $X_{n-K}$ on lead 161 using GPRP 629 which is structurally identical to GPRP 179 of FIG. 1 as described before. The output of GPRP 629 is a complex signal $J_{n-K}$, having real and imaginary components, respectively, $J_{n-K}$ and $J_{n-K}^*$. Subtracter 615 provides the complex error signal $E_n^1$ having real and imaginary components, respectively, $e_n^1$ and $e_n^{1*}$, where $e_n^1 = (eq_{n-K} - j_{n-K})$ and $e_n^{1*} = (eq_{n-K}^* - J_{n-K}^*)$. This error signal $E_n^1$ is supplied to linear equalizer 607 for the purpose of coefficient updating in a conventional manner.

Returning briefly to the description of $EQ_n$ on lead 611, the noise that appears in $EQ_n$ is of the type characteristic of the channel over which the symbols were transmitted. Illustratively, the channel being a local loop, like many other channels, contributes to the transmitted symbols mostly the so-called "colored", rather than "white", noise arising from cross-talk within the transmission cable.

However, the trellis codes that have been developed to date, including for example, the code represented by the trellis diagram of FIG. 4, are known to provide coding gain in the presence of "white" noise.

This being so, in order to substantially realize the full coding gain of the trellis code used, the noise that appears in trellis-coded signals to be processed by decoder 603 is, by design, in accordance with the present invention, whitened before being decoded.

To this end, $EQ_n$ on lead 611 is input to conventional M+1st-order transversal filter 619 which whitens the noise that appears therein. Thus transversal filter 619 provides onto lead 613 a complex signal $Z_n$ which is destined for decoder 603, and which has a noise component ensured to be white.

Specifically, $Z_n$ has, respectively, real and imaginary components $z_n$ and $z_n^*$. Transversal filter 619 generates its output by forming linear combinations of the filter input components in accordance with the relations:

$$z_n = eq_n + \text{Re}(P_n^T u_n), \text{ and}$$

$$z_n^* = eq_n^* + \text{Im}(P_n^T u_n).$$

In these expressions $u_n$ is a (M×1) matrix, or vector, comprised of the M most recent complex output samples of linear equalizer 607. That is, $$u_n = \begin{bmatrix} eq_{n-1} + ieq_{n-1}^* \\ eq_{n-2} + ieq_{n-2}^* \\ \vdots \\ eq_{n-M} + ieq_{n-M}^* \end{bmatrix},$$

where M and $P_n$ are described hereinbefore.

It should be noted at this point that the above-described whitening process performed by transversal filter 619 would normally have introduced, as a concomitant, intersymbol interference or specifically the so-called "post-cursors", into its output signal $Z_n$. Based on the present design of the "whitening" filter—transversal filter 619, the generation of the "post-cursors" is prevented, in accordance with the present invention, using the aforementioned GPRS precoding in the transmitter. Specifically, the "whitening" filter is designed, as required by the GPRS precoding, to be of finite memory; that is, it takes in at a time a finite number—M—of the most recent inputs thereto. As described hereinbefore, GPRP 179 in transmitter section 121 performs such a precoding. This precoding further entails transporting from transversal filter 619 once per symbol interval a copy of the tap coefficients of $P_n$, which characterizes that filter, via internal bus 187 to GPRP 179 for use in the transversal filter therein. This provision of the tap coefficients from transversal filter 619 in the receiver of DWNT 101 is based upon a reasonable assumption that the characteristics of the illustrative channel—local loop 60—are non-directional. That is, the channel characteristics remain the same in either of the transmit direction or the receive direction of the channel. Otherwise, a copy of the tap coefficients would be supplied to GPRP 179, via local loop 60, from the counterpart of transversal filter 619 in the receiver of the associated DWLT, instead.

It should also be noted that in the present illustration, transversal filter 619 and transversal filters in all the GPRPs, use the same copy of $P_n$. This includes GPRP 629 which takes in a copy of $P_n$ via internal bus 618. This being so, it advantageously facilitates the adaptive process in DWNT 101 because during each symbol interval, only one set of coefficients needs to be updated.

The values of the coefficients of $P_n$ are updated in transversal filter 619 in a conventional manner, based on the complex error signal $E_n^2$ on lead 617 input thereto. The initialization of all the tap coefficients in DWNT 101 including those of transversal filter 619 and linear equalizer 607 is to be described hereinbelow.

The complex error signal $E_n^2$ is produced by decision and error signal generator 609. The production involves storing $Z_n$ on output lead 620 which is connected to input lead 614 of decoding circuitry 660 therein. Buffer 633, which is identical to buffer 621 as described before, stores $Z_n$ for K symbol intervals. The output of buffer 633 is thus a delayed version of $Z_n$ which is denoted $Z_{n-K}$. Subtracter 637 takes in $Z_{n-K}$ as one input and as the other input a second signal on lead 630 which is connected to output lead 625 of decoder 603. This second signal is denoted $D_{n-K}$ and is the current output of decoder 603. Subtracter 637 thus subtracts the real and imaginary components of $D_{n-K}$ from the corresponding components of $Z_{n-K}$ and provides on lead 617 complex error signal $E_n{}^2$.

$Z_n$ on lead 614 is fed to decoding circuitry 660 wherein decoder 603 performs a trellis decoding on $Z_n$ with the Viterbi algorithm of conventional design. Details on the Viterbi algorithm can be referred to G. Ungerboeck, "Channel Coding With Expanded Signal Sets," *IEEE Trans. on Information Theory*, Vol. IT-28, No. 1, January, 1982, and G. Ungerboeck, "Trellis-Coded Modulation With Redundant Signal Sets, Part I and II, " *Communications Magazine*, IEEE Communication Society, February, 1987. Also of interest is the discussion in G. D. Forney, "The Viterbi Algorithm", *Proceedings of the IEEE*, Vol. 761, pp. 268-278, March, 1973.

Figure 7:
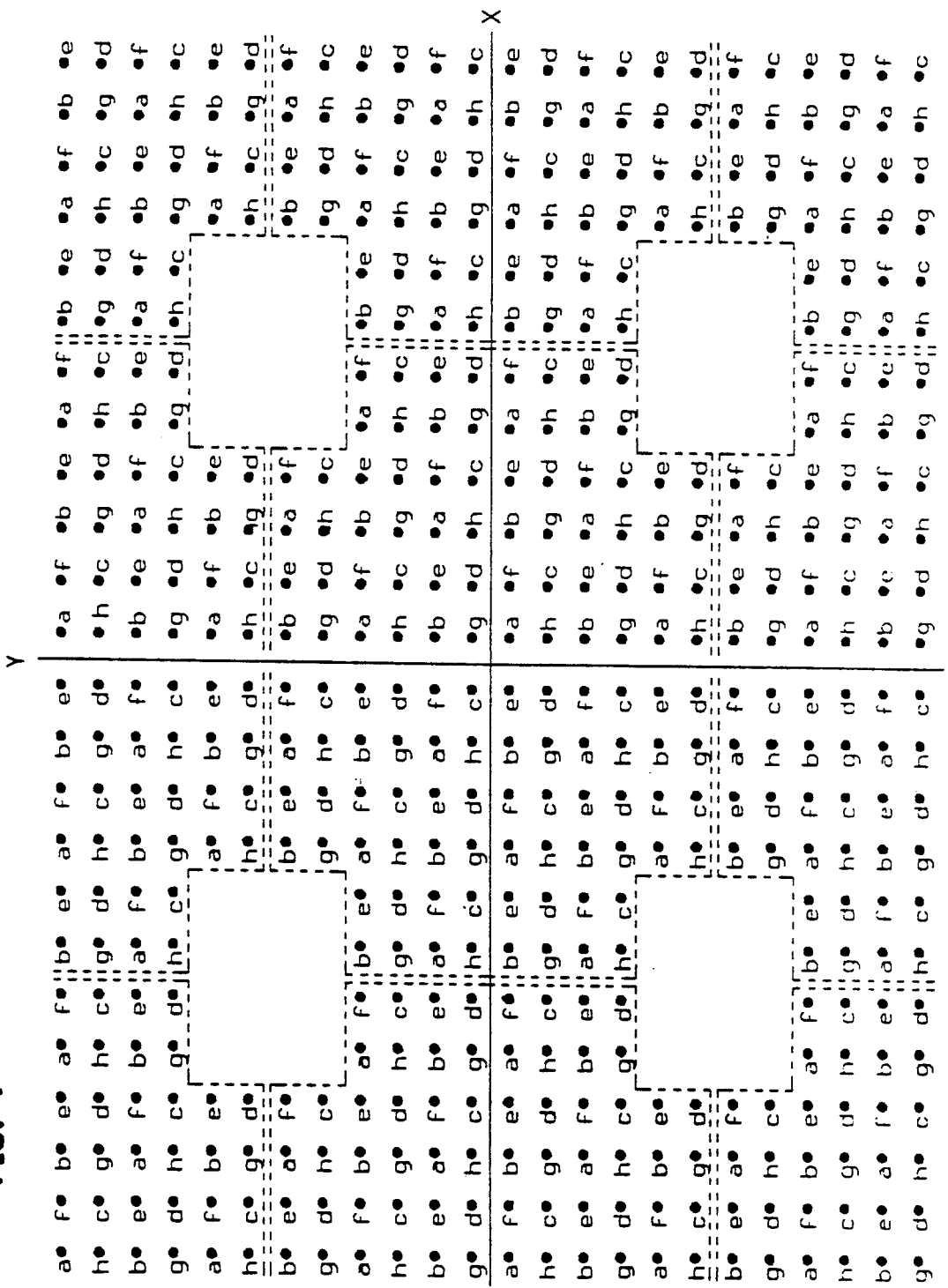
FIG. 7 is a signal constellation appearing at the input of the decoding process performed by the circuitry of FIG. 6 using the signal constellation of FIG. 2.

Based on the input to decoder 603, the knowledge of the trellis code used in coder 140 and a predetermined configuration of so-called "allowed symbols", the Viterbi algorithm generates with a delay of K symbol intervals the "maximum-likelihood" decisions as to what the most likely allowed symbols that input represents. The predetermined configuration of the allowed symbols describes the arrangement of symbols that can possibly appear at decoder 603. It should be pointed out that in the present embodiment this predetermined configuration is different from, for example, FIG. 2 which is the constellation used in the transmitter and to which the Viterbi algorithm normally refers. In fact, it can be shown that FIG. 7 depicts such a configuration.

As a result of the expansion of the constellation of FIG. 2 caused by the GPRS precoding as noted previously, FIG. 7 is realized to be an expanded version of FIG. 2. Specifically, FIG. 7 has in the center the constellation of FIG. 2 enclosed in a dashed cruciform box, and surrounding the cruciform box truncated constellations of FIG. 2, or more specifically, four halves and four quarters of FIG. 2 as defined by dashed lines. The existence of the truncated constellations is a consequence of the power limiting effect caused by the nonlinear filters of the GPRP. Otherwise, were there no power limit, FIG. 7 would be comprised of a virtually limitless number of complete constellations of FIG. 2 repeated throughout the X-Y plane.

As described hereinbefore, those nonlinear filters of the GPRP, for example, nonlinear filter 505, limit the values of the "x" and "y" components of the channel symbols to be transmitted between $-L$ and L, where $L=12$—the GPRS bound—in this illustrative embodiment. This in turn limits the number of levels of values that can be individually assumed by the "x" and "y" components of the allowed symbols of FIG. 7. The resulting number of levels turns out to be 2L. This being so, FIG. 7 takes the form of a centered truncated square of 2L levels by 2L levels of the otherwise X-Y plane comprised of a virtually limitless number of the constellations of FIG. 2 as in the power-unlimited case.

An individual one of the aforementioned "maximum likelihood" decisions is denoted $D_{n-K}$ and is provided by decoder 603 on to lead 625 which extends to nonlinear filter 627. It can be shown mathematically that nonlinear filter 627, which is identical to nonlinear filter 505 as described hereinbefore, recovers symbols representing Y0 through Y6 based on the maximum likelihood decisions. An individual one of signals identifying those symbols, namely $X_{n-K}$, is provided by nonlinear filter 627 onto lead 161.

The foregoing sets forth the normal operation of decision output circuitry 150. However, in response to the control signal A, as mentioned before, circuitry 150 switches to the training mode for initializing the tap coefficients of the adaptive filters therein.

The training process involves connecting T/3 linear equalizer 607 and M + 1st-order transversal filter 619 to decision and error signal generator 640 and dissociating them from decision and error signal generator 609. Specifically, switches 631, 635, 638 and 639 altogether switch to respective positions 2 in response to the control signal A. By doing so, switch 631 couples an initialization error signal $IE_n{}^1$ from decision and error signal generator 640 to T/3 linear equalizer 607; switch 635 couples $EQ_n$ on lead 611 to subtracter 651 within the generator; switch 638 couples another initialization error signal $IE_n{}^2$ from the generator to transversal filter 619; and switch 639 connects transversal filter 619 to subtracter 641 within the generator. The resulting arrangement of decision output circuitry 150 is a conventional adaptive decision feedback equalizer where linear equalizer 607 together with transversal filter 619 becomes the so-called "feedforward filter"; Mth-order transversal filter 653 within decision and error signal generator 640 becomes the so-called "decision feedback filter;" and slicer 643 becomes the so-called "decision generator" associated therewith.

During the training process, all the tap coefficients in decision output circuitry 150 including those of Mth-order transversal filter 619 are initially set to zero. The tap coefficients of linear equalizer 607 and transversal filter 619 are thereafter optimally adjusted in a conventional manner, based on, respectively, the complex initialization error signals $IE_2{}^1$ and $IE_n{}^2$. The resulting set of tap coefficients associated with transversal filter 619 is transported via internal buses, as mentioned before, to all the GPRPs in DWNT 101 for use in their respective transversal filters.

Subtracter 651 provides $IE_n{}^1$ by subtracting the real and imaginary components of $EQ_n$, which are now associated with the aforementioned initialization input bits IY0-IY6 in the transmitter, from the corresponding components of $SL_n$. The latter is, as described hereinbelow, the output of conventional slicer 643. $IE_n{}^2$ is provided by subtracter 649 which subtracts the real and imaginary components of $SL_n$ from the corresponding components of a complex signal $Q_n$. Subtracter 647 generates the complex signal $Q_n$ by subtracting the real and imaginary components of $Z_n$, which is now associated with the aforementioned initialization input bits IY0-IY6, from the corresponding components of a complex signal $H_n$. This last complex signal is provided through processing $SL_n$ using transversal filter 645 which is identical to transversal filter 509 of FIG. 5 as described before. The tap coefficients of transversal filter 645 are supplied by transversal filter 619 via internal bus 653.

Slicer 643 provides in a conventional manner at its output the aforementioned complex signal $SL_n$ which is the quantized version of a complex signal $SU_n$ input thereto. Subtracter 641 generates the complex signal $SU_n$ by subtracting the real and imaginary components of $H_n$ from the corresponding components of $Z_n$.

Returning to FIG. 1, the aforementioned symbol-identifying signals on lead 161 provided by decision output circuitry 150 are input to symbol-to-bit-converter 162. This converter performs the inverse function of bit-to-symbol converter 177, thereby recovering the values of bits Y0 through Y6. Since the values of Y0 through Y6 are identical to the values of X0 through X6, these values can be directly passed through parallel-to-serial converter 164 and descrambler 165 in order to provide the bit stream that was input to the associated DWLT.

In order to advantageously simplify the decoding process as illustrated in the first embodiment which is fully described hereinbefore, a second embodiment is included. This second embodiment is identical to the first embodiment except for the decoding circuitry in decision output circuitry 150 of FIG. 6. Specifically, in the second embodiment, decoding circuitry 880 of FIG. 8 replaces decoding circuitry 660 in FIG. 6.

A closer look at FIG. 8 reveals that unlike decoding circuitry 660 in the first embodiment, decoding circuitry 880 has nonlinear filter 827 preceding decoder 803. Nonlinear filter 827 is structurally identical to nonlinear filter 627 as described before. After processing $Z_n$ on input lead 614, nonlinear filter 627 provides a complex signal $NF_n$ on to leads 810 and 620.

Decoder 803, like decoder 603, implements the Viterbi algorithm on its input $NF_n$ on lead 810. Similarly, based on the knowledge of the trellis code used in coder 140 and a predetermined configuration of the allowed symbols at decoder 803, the Viterbi algorithm generates with a delay of K symbol intervals the maximumlikelihood decisions as to what the most likely allowed symbols that $NF_n$ represents. An individual one of the maximum-likelihood decisions is, now, denoted $X_{n-K}$ and is provided by decoder 803 on to leads 630 and 161.

In accordance with GPRS, the aforementioned predetermined configuration of allowed symbols at decoder 803 is, in fact, represented by FIG. 2. This being so, the decoding process in the present illustrative embodiment is advantageously simpler than that in the first embodiment. This stems from the fact that FIG. 2 is comprised of fewer allowed symbols than FIG. 7 of the first embodiment. Thus, the decoding process in the present embodiment results in fewer calculations in the implementation of the Viterbi algorithm. These calculations of, for example, figuring out squared Euclidean distances between individual allowed symbols and the symbol represented by a decoder input enable the algorithm to make a plurality of the so-called "tentative" decisions as to, in this case, what symbol was generated by bit-to-symbol converter 177.

There are inputs of decoder 803 representing symbols which lie outside the boundary of FIG. 2, the boundary being defined by the dash-dotted line. Based on such a decoder input, the tentative decisions generated by the Viterbi algorithm would be ones of the allowed symbols next to the boundary. However, it can be shown that in this particular embodiment, not all of such "tentative" decisions are accurate and thus contribute errors to the Viterbi algorithm in making the maximum likelihood decisions. It can also be shown that to correct this situation, one needs to slightly modify the Viterbi algorithm and include artificial symbols outside the boundary of FIG. 2. FIG. 9 shows the resulting configuration of the artificial symbols and the allowed symbols. Each of these artificial symbols is notated with a superscript of an asterisk. It can be seen that FIG. 9 is identical to FIG. 2 except that the former includes outside the boundary eight artificial symbols on each side thereof and thus a total of thirty-two such symbols.

Based on FIG. 9 as the aforementioned predetermined configuration, when a decoder input represents a symbol which is outside the boundary, the Viterbi algorithm would, in a conventional manner, identify a number of the artificial symbols as ones of the tentative decisions. However, the artificial symbols thus identified are not the allowed symbols which bit-to-symbol converter 177 could possibly generate. This being so, it can be shown that these identified artificial symbols ought to be converted to certain allowed symbols associated therewith and treated as though the latter were identified. FIG. 9 shows this association using identical pairs of subset identifications and subscripts, which are arbitrarily numbered. For example, artificial symbol $h_0^*$ is associated with allowed symbol $h_0$; $c_1^*$ is associated with $c_1$; and so on and so forth. The present Viterbi algorithm in this particular embodiment is modified to accommodate the above-described conversion, which may be carried out, for example, by looking up a predetermined conversion table.

Turning to a third embodiment which is virtually identical to the foregoing second embodiment, in particular, the decoding circuitry in this embodiment is structurally identical to aforementioned decoding circuitry 880. That is, the nonlinear filter, here, also precedes the decoder. However, unlike the second embodiment, the Viterbi algorithm and the predetermined configuration of the allowed symbols—FIG. 2—in this particular embodiment are advantageously unmodified, thereby further simplifying the decoding process. It can be shown that this simplification is accomplished in the present disclosed embodiment by increasing the value of the aforementioned paramenter L associated with the nonlinear filters. Specifically, these filters correspond to nonlinear filters 505, 506 and the nonlinear filters in GPRP 629 and decoding circuitry 660 of the first embodiment. Thus, unlike the first and second embodiment in which L=12, the value of L in this particular embodiment exceeds 12—the GPRS bound. In fact, L is experimentally determined to be 14 in the present illustrative embodiment. However, the increase in the value of L entails more power consumption in the GPRP of the transmitter, thereby decreasing the overall coding gain of DWNT 101 in a power-limited environment. It can be shown that this increase in the value of L from 12 to 14 results in a decrease of no more than 0.7 dB in the coding gain using FIG. 2 as the signal constellation in the transmitter. However, it can also be shown that this decrease in the coding gain diminishes with increasing size of the signal constellation.

The foregoing merely illustrates the principles of the invention and those skilled in the art will be able to devise numerous arrangements which, although not explicitly shown or described herein, embody the principles of the invention. By way of example, but not limitation, some possible variations and alternatives will now be described.

For example, the illustrative embodiments disclose the invention in the context of a DWNT used in an ISDN environment. However, the present invention is equally usable in a voiceband modem communicating on, e.g., a voiceband telephone channel, at a bit rate of at least 19.2 kb/s, e.g., 24 kb/s or even higher.

The invention has been disclosed in the context of a circuit-oriented ISDN environment. However, it can also be used to provide high-speed data transmission in totally packetized non-ISDN environments, as well. It is, in addition, usable for use not only in telephone local loop transmission, but other suitable environments. Thus, for example, a DWNT embodying the principles of the invention could be used to interconnect—over a telephone local loop or other transmission loop—a local area network and a wide area network; a telephone central office and a local area network; a PBX and a central office, two PBXs, etc. In addition, in particular applications it may be advantageous to implement the DWNT in a "data over voice" mode in which the spectrum of the DWNT line signal is positioned so as to leave room at the lower end of the frequency spectrum for the insertion of an accompanying voice signal.

The invention has been disclosed using carrierless AM/PM. However, other passband transmission schemes, including non-carrierless schemes such as quadrature-amplitude modulation, can be used to implement the invention. Similarly, although the illustrative embodiments utilize a two-dimensional modulation scheme, the invention can be implemented using modulation schemes of any other desired dimensionality, including, for example, one, four or eight dimensions. Advantageously, a multi-dimensional modulated signal may be more robust in the presence of particular channel impairments than, say, a one-dimensional, e.g., single sideband, modulated signal. In addition, as long as the coordinates of the symbol in each dimension are dependent—that is, each coordinate is a function of all of the data bits that the symbol represents, rather than being an independent function of some subset of those bits—increasing the dimensionality of the symbols increases the margin against noise and various channel impairments. Indeed, the improved receiver error performance may be sufficiently significant to make worthwhile the added implementational complexity of using, say, four or eight dimensions.

The invention has been illustrated in the context of a network termination which operates at 480 kb/s. However, it could be used at lower bit rates, e.g., 160 kb/s, or higher bit rates, e.g., 1.544 Mb/s if this were found to be desirable.

All in all, we believe that Nyquist rate echo cancellation, such as shown in FIG. 1, is probably the technically superior approach for a DWNT. From a commercial standpoint, however, symbol rate echo cancellation may be the preferred approach, particularly at 1.544 Mb/s, until the cost of very high speed A/D converters comes down.

The illustrative embodiments disclose the invention in the context of transmission over a two-wire loop. An alternative, however, is to use a four-wire loop, i.e., a separate two-wire loop for each direction of transmission, in which case, of course, no echo cancellation would be needed.

Finally, the invention is disclosed herein in a form in which the various signal processing functions are performed by discrete functional blocks. However, any one or more of these functions could equally well be performed by one or more appropriately programmed microprocessors, microcoded digital signal processing chips, etc.

We claim:

1. Apparatus for transmitting a data signal which represents information, said data signal being corrupted by noise which is substantially colored after propagating through a communications medium, said apparatus comprising
   means for encoding said information using a code, the utilized code providing the encoded information having improved immunity to white noise relative to the uncoded information, and
   means for nonlinearly processing said encoded information in such a manner that distortion associated with subsequent whitening of said noise in receiver apparatus is reduced.

2. The apparatus of claim 1 wherein said code is a trellis code.

3. The apparatus of claim 1 wherein said processing means employs generalized partial response signaling.

4. The apparatus of claim 3 wherein a parameter L is associated with said processing means, the value of said parameter L being at least a generalized partial response signaling bound.

5. A method for transmitting a data signal which represents information, said data signal being corrupted by noise which is substantially colored after propagating through a communications medium, said method comprising the steps of
   encoding said information using a code, the utilized code providing the encoded information having improved immunity to white noise relative to the uncoded information, and
   nonlinearly processing said encoded information in such a manner that distortion associated with subsequent whitening of said noise in receiver apparatus is reduced.

6. The method of claim 5 wherein said code is a trellis code.

7. The method of claim 5 wherein said processing step employs generalized partial response signaling.

8. The method of claim 7 wherein a parameter L is associated with said processing step, the value of said parameter L being at least a generalized partial response signaling bound.

* * * * *